United States Patent [19]

Jacobs et al.

[11] Patent Number: 4,573,208

[45] Date of Patent: Feb. 25, 1986

[54] COMPRESSED SINGLE SIDE BAND COMMUNICATIONS SYSTEM AND METHOD

[75] Inventors: Paul H. Jacobs, Fairport; Douglas P. Collette, Stafford, both of N.Y.

[73] Assignee: Aerotron, Inc., Raleigh, N.C.

[21] Appl. No.: 558,046

[22] Filed: Jan. 26, 1984

Related U.S. Application Data

[62] Division of Ser. No. 384,148, Jun. 1, 1982, Pat. No. 4,539,707.

[51] Int. Cl.[4] .................. H04B 1/76; H04B 7/00
[52] U.S. Cl. ........................ 455/71; 455/47; 455/203; 455/265
[58] Field of Search .............. 455/46, 47, 70, 71, 455/75, 202, 203, 258, 259, 260, 265; 375/97

[56] References Cited

U.S. PATENT DOCUMENTS

3,108,158 10/1963 Jones ..................... 455/46
3,271,681 9/1966 McNair ................... 455/71

Primary Examiner—Marc E. Bookbinder
Attorney, Agent, or Firm—L. Lawton Rogers, III

[57] ABSTRACT

A compressed single side band communication system and method in which the audio signal is compressed prior to pre-emphasis and thereafter summed with a pilot tone for further compression prior to transmission. Initially, only the pilot tone is transmitted at full rated power to aid in acquisition of the signal by the receiver. Thereafter, the transmitter ALC is disabled and the pilot tone is attenuated. The receiver adjusts the frequency characteristics of the pilot tone filter and phase lock loop filter in the detector as a function of lock-on. The delay after loss of lock-on in reverting to wide band pilot tone and wideband loop filters is varied as a function of signal strength. The pilot tone may be modulated for tone coded squelch. The modulating source is located in the return end of the phase lock loop filter. A unique filter is provided to insure acquisition of the pilot tone. Automatic gain control of the audio signal is responsive to the tone signal without affecting the composite audio and tone signal.

6 Claims, 10 Drawing Figures

FIG. 3
RECEIVER (PRIOR ART)

FIG. 4
RECEIVER

FIG. 5 LOGIC

FIG. 10 PILOT TONE MODULATOR

COMPRESSED SINGLE SIDE BAND COMMUNICATIONS SYSTEM AND METHOD

This is a division, of application Ser. No. 384,148, filed June 1, 1982 now U.S. Pat. No. 4,539,707.

BACKGROUND OF THE INVENTION

The present invention relates to a radio frequency communications system and method, and more particularly to a two-way single sideband, land mobile system in which a pilot tone is transmitted with an audio signal and a phase lock loop used to acquire the pilot tone and thus the audio signal.

Known prior art systems of this type have pre-emphasized the audio signal prior to compression. However, the desired degree of pre-emphasis has been difficult to achieve. In one aspect, the present invention greatly simplifies the pre-emphasis circuit by compressing the audio signal before pre-emphasis.

Automatic level control circuits (ALC) are well known and generally operate to maintain a constant output power from the transmitter. Since the output power of a single sideband transmitter is a function of the amplitude of the modulation signal applied thereto, the output power of known transmitters tends to widely fluctuate as a result of the widely varying characteristics of a typical audio signal. In another aspect, the present invention obviates this problem by adjusting the power of the transmitter only during an initial time interval when a constant amplitude signal is present, and thereafter maintaining the gain of the transmitter constant. A limiter in the audio circuits of the transmitter thereafter limits the amplitude of audio signals and thus prevents the transmitter power output from exceeding its rated value.

In generally known systems, the pilot tone may be masked by audio frequency components, or alternatively the phase lock loop of the receiver may try to lock on a portion of the audio signal making initial acquisition difficult. In one aspect, the present invention obviates this problem by transmitting only the pilot tone for a period of time sufficient for acquisition thereof by the phase lock loop of the receiver. Once acquisition has been achieved, the frequency response characteristics of the pilot tone filter are narrowed and the pilot tone attenuated to avoid possible interference with the audio signal without loss of lock-on.

Frequency modulation of the pilot tone for tone coded squelch purposes is known. In this way, the audio signal of a particular receiver may be gated off to avoid extraneous noise until such time as a uniquely coded pilot tone is received. In a further aspect, the present invention achieves frequency modulation of the pilot tone by locating the modulating source in the return end of the loop filter of a phase lock loop. Simplicity of circuit design may thus be achieved when the frequency of modulation is high with respect to the bandwidth of the loop filter associated with the phase lock loop.

In receivers in systems of the type heretofore described, the frequency response characteristics of the loop filter are varied as a function of lock-on of the phase lock loop. In this way, the pilot tone may be rapidly acquired and thereafter maintained in the event of the temporary fades characteristic of two-way, land mobile communications. In another aspect, the present invention improves upon this feature by detecting the strength of the detected pilot tone immediately prior to loss of lock-on, and increasing the delay in reverting to the rapid acquisition mode under conditions where the signal is weak and fades are likely to be longer in duration.

In generally known prior art receivers, the amplitude of the pilot tone is detected and used to control the gain of the receiver, i.e., to adjust the strength of the composite audio and tone signal to bring the tone signal up to a predetermined level. Since the amplitude of the pilot tone is being adjusted in such receivers in response to detection of the pilot tone, undesirable "hunting" may result. This problem is avoided in the present invention by using the signal strength of the detected pilot tone to control only the gain of the audio signal components of the composite signal.

In generally known systems, the speed of response in acquisition of the pilot tone is a function of the bandwidth of the pilot filter. As explained in connection with the transmitter of the present invention, the initial transmission of a full power, unattenuated pilot tone greatly facilitates lock-on. Thereafter, the pilot filter may be switched to a narrow band mode and the amplitude of the pilot tone reduced without the loss of lock-on as a result of the presence of a high amplitude audio signal. Thus, the present invention controls the frequency response characteristics of the pilot filter as a function of phase lock loop lock-on.

In addition, the amount of delay in switching to the acquisition mode following loss of lock-on may be adjusted as a function of signal strength immediately prior to the loss of lock-on. The amount of delay in switching to the wideband pilot filter is always greater than the amount of delay in switching to the wideband phase lock loop filter. This allows the loop to make rapid corrections if the received pilot signal drifts in frequency without increasing the pilot filter bandwidth and thus subjecting the loop to possible interference from audio components of the received signal An additional problem in generally known receivers is the acquisition of the pilot tone in the presence of an audio signal. As earlier explained, the present invention transmits the pilot tone only during an initial time interval. In addition, the frequency response characteristics of the wideband pilot tone filter are desirably selected such that noise tends to drive the oscillator associated with the phase lock loop to one extreme, thereby tending to center the pilot tone in the bandwidth of receiver's IF filter (the primary selectivity element). In this way, the presence of the tone is immediately detected even if that tone is not exactly on the expected frequency. This minimizes the requirement for oscillator stability in the transmitter and receiver and this reduces cost and complexity.

The foregoing and many other features, objects and advantages of the present invention will be readily apparent to one skilled in this art from the claims and from a perusal of the following specification when read in conjunction with the appended drawings.

THE DETAILED DESCRIPTION OF PREFERRED EMBODIMENTS

Figure 1:
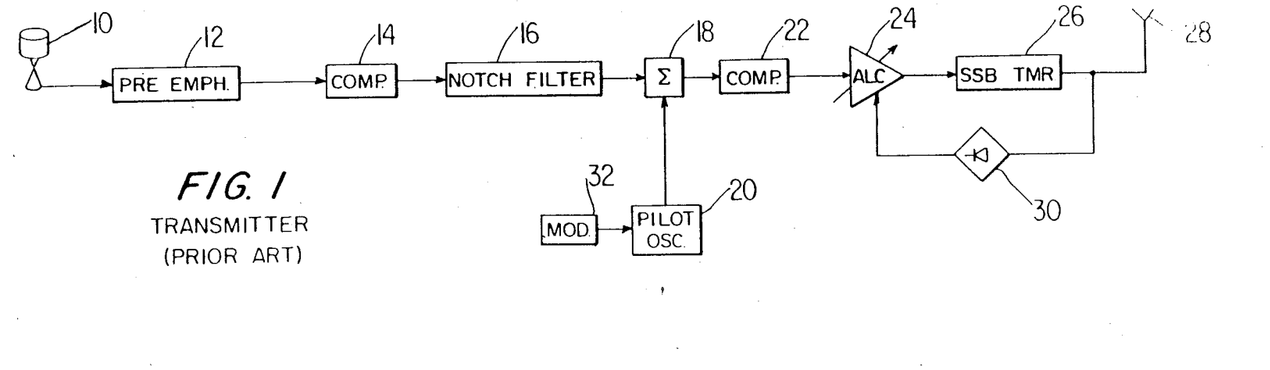
FIG. 1 is a functional block diagram of a prior art transmitter.

An understanding of the transmitter of the present invention may be facilitated by an understanding of the prior art transmitters. With reference to FIG. 1 where a prior art transmitter is illustrated, a suitable conventional microphone 10 may be used to pick up an audio signal. The microphone 10 may be of the conventional push-to-talk type and the output signal therefrom applied to a suitable conventional pre-emphasis circuit 12. Inasmuch as most of the energy in an audio frequency signal is concentrated at the low frequencies, the pre-emphasis circuit desirably provides a 12 dB per octave gain so that the gain applied to the signal is increased as a function of the frequency of the signals passed therethrough.

The output signal from the pre-emphasis circuit 12 may be applied to a suitable conventional compressor 14 where the entire audio signal is compressed. The compressed signal is thereafter applied through a suitable conventional notch filter 16 to one input terminal of a summing circuit 18 such as a summing amplifier. The notch filter 16 serves to remove audio frequency components in a narrow band centered on the frequency of the pilot tone, e.g. 3.1 KHz.

The other input terminal of the summing circuit 18 receives a pilot tone from a pilot oscillator 20 and the composite output signal, i.e., the pilot tone and audio signal, is applied through a second suitable conventional compressor 22 to the variable gain amplifier of an automatic level control circuit 24 at the input of a conventional single sideband transmitter 26. The output signal from the transmitter 26 is applied to a suitable conventional antenna 28 for broadcast and is also fed back through a rectifier 30 to control the gain of the automatic level controlled amplifier 24.

The frequency of the pilot oscillator 20 may be modulated by a suitable conventional modulator 32 for purposes of providing a tone coded squelch signal at the receiver.

In operation, the audio signal from the microphone 10 is pre-emphasize compressed and combined with the frequency modulated pilot tone. This composite signal is further compressed in the compressor 22 and applied to the single sideband transmitter as the modulation signal thereof for transmission. The output power of the transmitter 26 is controlled continuously during the transmission by means of the automatic level control circuit so that the peak value of output signal from the antenna 28 does not exceed the rated power capability of the SSB transmitter 26. The system gain may vary considerably as the speaker's voice varies.

Figure 2:
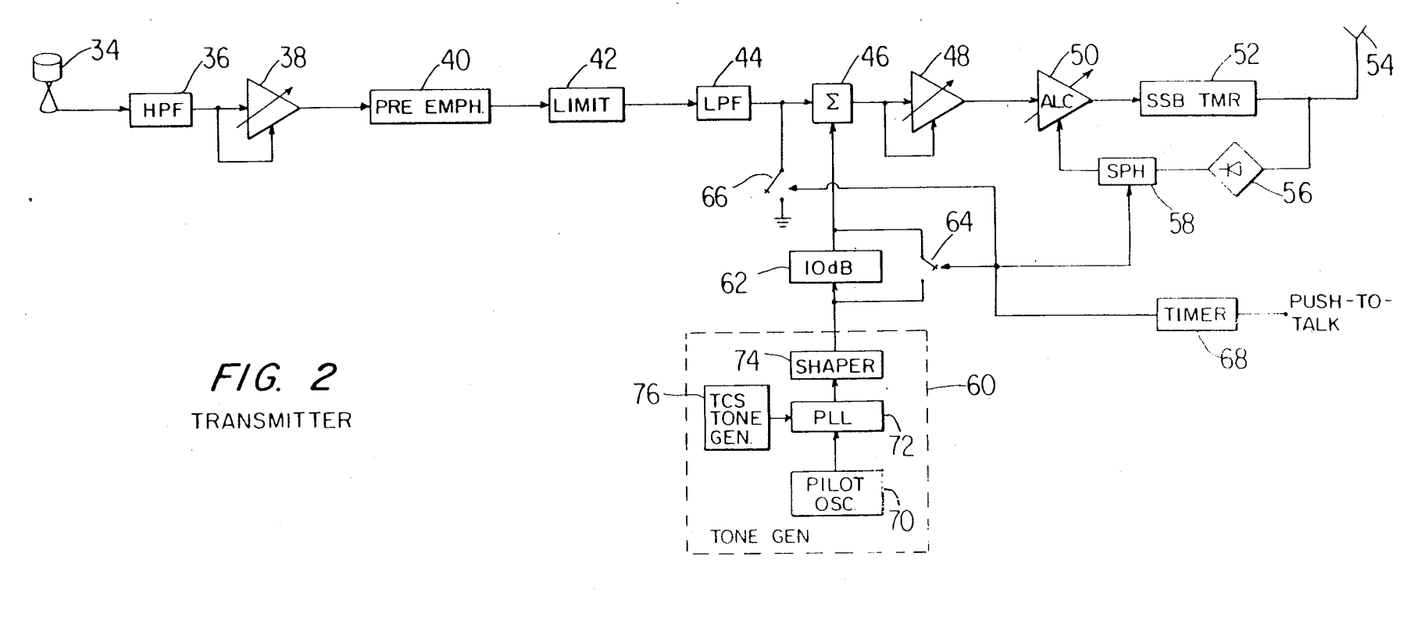
FIG. 2 is a functional block diagram of one embodiment of the transmitter of the present invention; .

With reference now to FIG. 2 where one embodiment of the transmitter of the present invention is illustrated, a suitable conventional microphone 34 may be used to provide an audio signal to be passed through an audio response limiting filter 36 to a compressor 38. The compressed audio signal is passed through a suitable conventional 6 dB per octave pre-emphasis circuit 40, and through a limit circuit 42 to a suitable conventional low pass filter 44. The limit circuit 42 is important because the amplitude of the modulation signal effects the output power of a single sideband transmitter.

The compressed audio output signal from the filter 44 is applied to a conventional summing circuit 46. As is subsequently explained, the audio signal is combined with the pilot tone to form a composite signal. The composite signal is further compressed in compressor 48 and applied through a variable gain automatic level control amplifier 50 of a suitable conventional type to a single sideband transmitter 52 for transmission from a conventional antenna 54. The output signal from the transmitter 52 is also passed through a rectifier 56 to a sample and hold circuit 58, the output of which is used to control the gain of the ALC amplifier 50.

With continued reference to FIG. 2, the frequency modulated pilot tone from the tone generator 60 is applied through a suitable conventional attenuator 62 to the other input terminal of the summing circuit 46. A suitable electronic shunt 64 is provided to selectively eliminate the attenuator 62 and a suitable shunt 66 is provided at the output of the lowpass filter 44 to selectively remove the audio signal from the input to the summing circuit 46.

Control of the shunts 64 and 66 as well as the sample time of the sample-and-hold circuit 58 may be under control of a suitable conventional timer 68 responsive to the push-to-talk button of the transmitter.

In operation, the timer 68, when triggered by the initiation of a transmission, provides for a first predetermined time period an output signal which closes the shunts 64 and 66. Operation of the shunt 64 removes the attenuater 62 from the circuit and thus applies the frequency modulated pilot tone to the summing circuit 46 undiminished in amplitude. During the same period of time, operation of the shunt 66 shunts the audio output signal from the lowpass filter 44 to ground and thus removes the audio signal from the input to the summing circuit 46. Thus, for the initial time interval as determined by the timer 68 at the beginning of each transmission, the output signal of the summing circuit 46 will be an unattenuated pilot tone.

When the timer 68 times out, the shunts 64 and 66 are opened to respectively attenuate the amplitude of the frequency modulated pilot tone from the tone generator 60 and to apply the audio signal from the filter 44 to the summing circuit. Subsequently thereto, the output signal from the summing circuit 46 will be a composite signal including the audio signal and an attenuated frequency modulated pilot tone.

Also upon the timing out of the timer 68, the sample-and-hold circuit 58 is operated to freeze or fix the level of the control signal applied to the ALC amplifier 50. In this way, the automatic level control circuit for the transmitter 52 is operative to adjust the power gain of the transmitter only during the initial period of the timer 68, after which the power gain of the transmitter will remain unchanged for the duration of the transmission. The gain of amplifier 48 is initially adjusted to produce full rated power output from the transmitter when shunt 64 is closed. The limiter 42 is designed such that the peak value of the audio signal that it may pass does not exceed the output of tone generator 60. Thus the peak output of the transmitter during audio passages does not exceed the preset value (full rated power).

The use of the automatic level control circuit in association with the transmitter 52 is desirable in that the output power of the single sideband transmitter is a function of the amplitude of the input signal as well as being subject to changes in the response of the transmitter as a function of parameters such as temperature. In order to obtain a natural sounding communications system, it is desirable that the overall gain of the transmitter remain unchanged for the duration of any single transmission.

Figure 10:
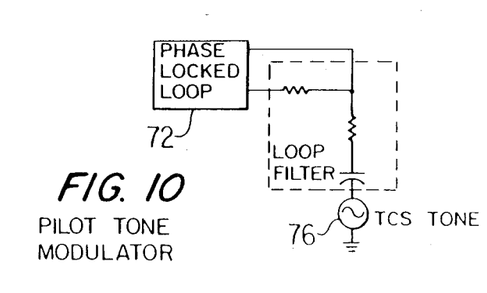
FIG. 10 is a circuit diagram illustrating the modulating of the pilot tone.

With continued reference to FIG. 2, the tone generator 60 may comprise a pilot tone oscillator 70, a phase lock loop 72, a shaper 74 and a tone coded squelch tone generator 76. In operation, the output signal from the pilot tone oscillator 70 is applied to a phase responsive frequency control loop (sometimes hereinafter "phase lock loop"). The frequency of the output signal from the phase lock loop 72 may be modulated for tone coded squelch purposes by the application of the low frequency signal from the TCS tone generator 76. With reference to FIG. 10, where the frequency of the modulation is significantly greater than the bandwidth of the loop filter, the frequency modulation of the pilot tone may be accomplished by locating the modulating source at the point where the loop filter would normally be returned to ground.

Note that the compressor 38 preceeds the pre-emphasis circuit 40. In this way, a 6 dB per octave pre-emphasis after compression provides the equivalent of 12 dB per octave prior to compression.

Figure 3:
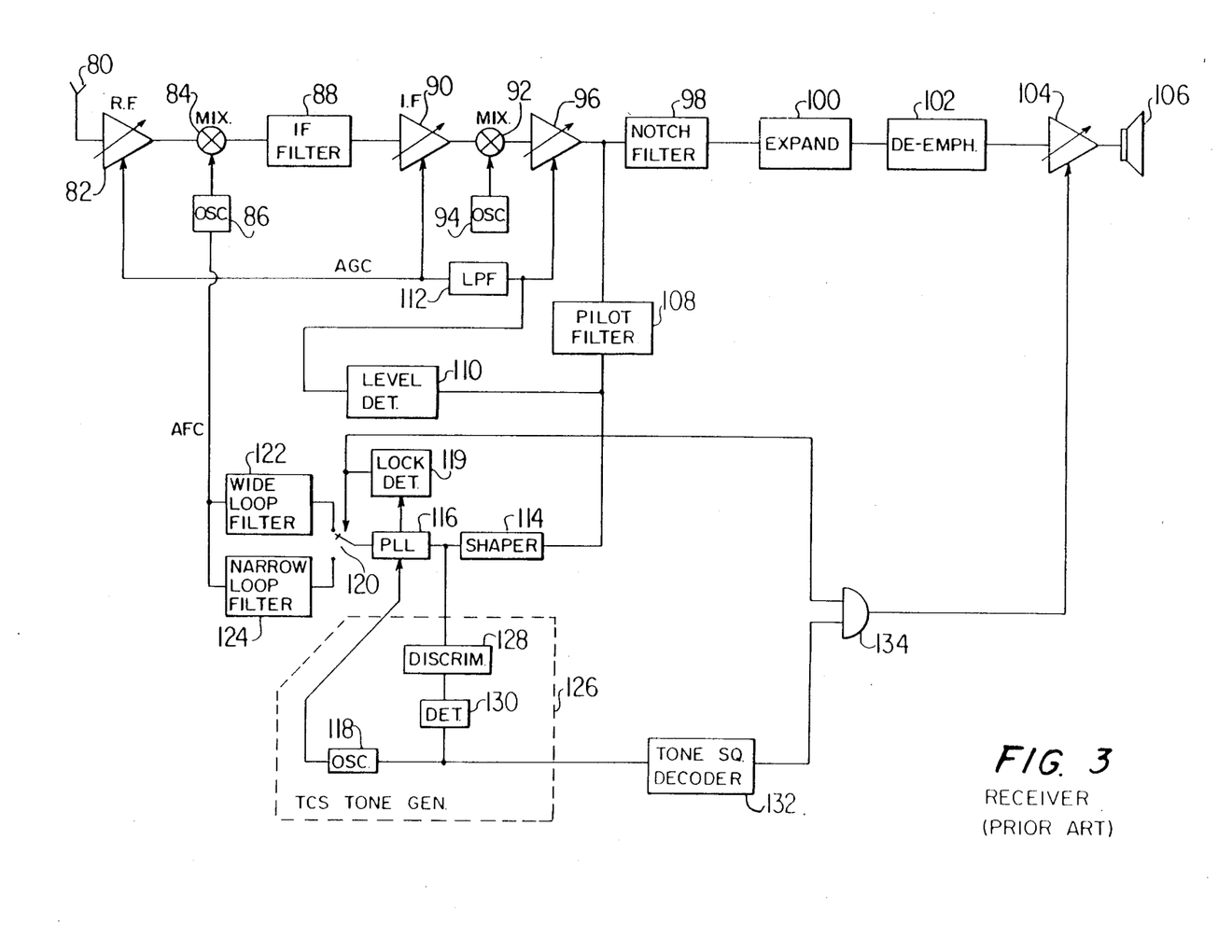
FIG. 3 is a functional block diagram of a prior art receiver.

The receiver of the present invention may also be more easily understood with reference to a prior art receiver. With reference to FIG. 3 where a prior art receiver is illustrated, the signal broadcast from the transmitter of FIG. 1 may be received by the antenna 80 and passed through a variable gain, radio frequency amplifier 82 to a suitable conventional mixer 84 where it is mixed with the output signal from an oscillator 86. The output signal from the mixer 84 may be applied through a suitable conventional intermediate frequency filter 88 and a conventional IF variable gain amplifier 90 to a second mixer 92 for mixing with the output signal from a conventional oscillator 94. The output signal from the mixer 92 may be passed through a variable gain audio amplifier 96 to a conventional notch filter 98 where the pilot tone is removed.

The audio output signal from the notch filter 98 may then be expanded in a suitable conventional expander circuit 100 and deemphasized in a de-emphasis circuit 102 to remove the effects of the pre-emphasis circuit 12 of FIG. 1. The expanded and deemphasized audio signal may then be passed through a suitable conventional variable gain amplifier 104 to a speaker 106.

The composite output signal from the amplifier 96 may also be passed through a pilot filter 108 to remove audio signal. The pilot signal amplitude is detected in a level detector 110 and used to control the gain of the amplifier 96 to provide a constant pilot amplitude at the pilot filter output terminal.

The output signal from the level detector 110 may also be passed through a low pass filter 112 and applied to the radio frequency and intermediate amplifiers 82 and 90 respectively to control the gain thereof. Thus, the amplitude of the pilot tone is used to dynamically control the gain of the composite signal passing through the receiver.

The output signal from the pilot filter 108 may also be applied to a shaper 114 where it is limited or clipped to a predetermined level and thereafter passed through a constant gain amplifier to provide an output signal of constant amplitude. The output signal from the shaper 114 may be applied to one input terminal of a conventional phase lock loop 116 to which the output signal from an oscillator 118 is applied. Lock-on of the phase lock loop 116 may be detected by a conventional lock detector 119 and the output signal therefrom used to control a switch 120 which controls the application of the output signal from the phase lock loop 116 to one of two loop filters 122 and 124. The output terminals of the loop filters 122 and 124 are applied to the oscillator 86 as an automatic frequency control signal to vary the output frequency of the oscillator 86 to bring the frequency of the received signal into lock with the frequency of the oscillator 118.

In operation, and in the absence of a signal from the lock detector 119, the output signal of the phase lock loop 116 is applied through the wide loop filter 122 to facilitate capture of the input signal. Once lock is detected by the lock detector 119, the switch 120 is activated to apply the output signal from the phase lock loop through the narrow loop filter 124. The response of the narrow loop filter is desirably very sluggish and thus tends to maintain a constant value output signal for application to the oscillator 86.

With continued reference to the prior art receiver of FIG. 3, the oscillator 118 which provides one input signal to the phase lock loop 116 may be conveniently located in the tone coded squelch (TCS) circuit tone detector 126. The TCS tone detector receives the shaped tone output signal from the shaper 114 and includes a discriminator 128 and a detector 130 to remove the frequency modulation from the frequency modulated pilot tone. The modulation removed by the discriminator 128 and detector 130 may be used to modulate the frequency of the output signal from the pilot tone oscillator 118 so that the two input signals to the phase lock loop 116 are both frequency modulated in the same manner.

The modulation removed by the discriminator 128 and detector 130 may be applied to a tone squelch decoder 132 which generates an output signal if the detected tone is of the correct frequency. A squelch circuit 134 may also be included that is responsive to the lock detector 119 output and/or the TCS decoder 132 output to allow the receiver to be muted until a correctly coded signal is received.

In a transceiver, as contrasted with separate transmitters and receivers, the pilot oscillator 20 of the transmitter of FIG. 1 and the oscillator 118 in the receiver illustrated in FIG. 3 may be the same unit.

Figure 4:
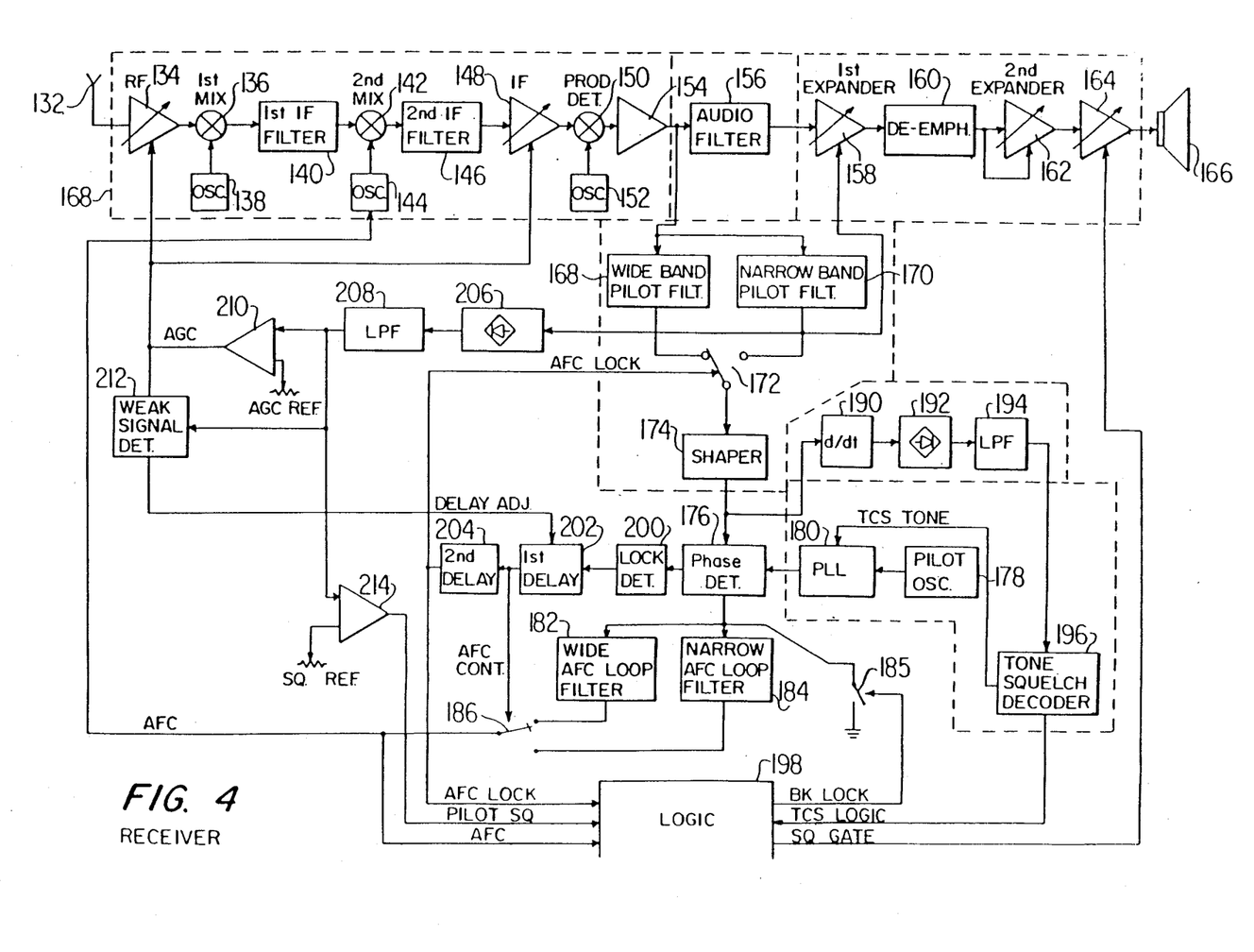
FIG. 4 is a functional block diagram of one embodiment of the receiver of the present invention.

Now with reference to FIG. 4 where one embodiment of the receiver of the present invention is illustrated, the signal broadcast by the antenna 54 of the transmitter of FIG. 2 may be received by the antenna 132. This input signal is applied through a suitable conventional variable gain RF amplifier 134 to a first mixer 136 where it is mixed with the output signal from a suitable conventional oscillator 138. The output signal from the first mixer 136 may be passed through a first IF filter 140 to a second mixer 142 there it is mixed with the output signal from a conventional oscillator 144. The output signal from the second mixer 142 may be passed through a second IF filter 146 and a suitable conventional variable gain IF amplifier 148 to a third mixer 150 where it is mixed with the output signal from a conventional oscillator 152 and thus converted to audio frequency signals. The output signal from the mixer 150 may be passed through an amplifier 154 as the composite signal containing compressed audio and frequency modulated pilot tone components.

The composite signal from the amplifier 154 may be applied through an audio filter 156 which operates to remove the pilot tone components and to delay the signal. This delayed audio signal is passed through a first expander which may be of the type subsequently described in connection with FIG. 7, and from there through suitable conventional de-emphasis circuit 160 where the effects of the pre-emphasis circuit 40 of the transmitter of FIG. 2 are reversed. The output signal from the de-emphasis circuit 160 may be passed through a second expander 162 and a suitable conventional variable gain audio amplifier 164 to a conventional speaker 166. Note that the second expansion occurs after the de-emphasis circuit 160.

In operation, the composite signal received by the antenna 132 is detected by the circuit elements indicated generally within the dashed lines 168 on FIG. 4. The pilot tone components are removed by the audio filter 156, and the compressed audio signal expanded, de-emphasized and expanded again for application to the speaker 166.

Note that the delay of the signal passing through the narrow band pilot filter 170 is desirably equal to the delay introduced by the audio filter 156 so that the expander 158 may be of the "feed forward" rather than the "feed back" type. The operation of the first expander 156 is discussed infra in more detail in connection with FIG. 7.

With continued reference to FIG. 4, the composite output signal from the amplifier 154 is applied to a wide band pilot filter 168 and a narrow band pilot filter 170. The output signal from the pilot filters 168 and 170 may be selectively applied by way of a suitable electronic switch 172 to a shaper 174. The shaper desirably includes a limiter to clip the amplitude thereof to a constant low level, and a constant gain amplifier. The output of the shaper 174 is thus a constant amplitude, frequency modulated pilot tone.

The output signal from the shaper 174 is applied to one input terminal of a phase detector 176. The reference input to phase detector 176 is the output signal of pilot tone oscillator 178 applied through a second phase lock loop 180. The output signal from the phase detector 176 is applied to the input terminals of a wide AFC loop filter 182 and a narrow AFC loop filter 184. The output signals from the AFC filters 182 and 184 are applied through a suitable electronic switch 186 as the automatic frequency control or AFC signal applied to the oscillator 144 to bring the pilot tone in the detected composite signal into lock with the locally generated pilot tone from oscillator 178.

The output signal from the shaper 174 may also be applied to a detector (FM discriminator) circuit 188 which desirably comprises a differentiating circuit 190, a rectifier 192 and a low pass filter 194. The function of the detector circuit 188 is to detect the frequency modulation of the pilot tone. The output signal from the detector 188 is applied to a tone squelch decoder 196 which acts a very high Q filter and provides a TCS TONE signal for application to the phase lock loop 180. In this way, the modulation of the pilot tone is detected by the detector 188 may be used to frequency modulate the output signal from the pilot tone oscillator 178 as it is applied to the phase detector 176.

In addition, the tone squelch decoder 196 provides a binary signal TCS LOGIC for application to a logic circuit 198 subsequently described in more detail in connection with FIG. 5.

With continued reference to FIG. 4, lock-on of the phase detector 176 may be detected by a conventional lock detector 200 and the output signal therefrom used to control the position of the switch 186 and thus divert the output signal from the phase detector 176 from the wide AFC loop filter 182 to the narrow AFC loop filter 184.

A first delay circuit 202 may be employed between the lock detector 200 and the switch 186, upon loss of lock-on, to delay the operation of the switch 186 for a predetermined time interval. This delay in switching from the narrow AFC loop filter 184 back to the wide AFC loop filter 182 is desirable where the loss of lock-on may be temporary due to multipath propagation causing signal cancellation or temporary fades. The response of the narrow loop filter is desirably slow such that the tuning of the oscillator 144 cannot change significantly during the interval of a temporary fade as long as filter 184 is selected.

The output signal from the first delay circuit 202 may also be passed through a second delay circuit 204 and the AFC LOCK output signal therefrom used to control the operation of the switch 172 which selects between the wide band pilot filter 168 and the narrow band pilot filter 170. Both the first and second delay circuits provide their respective delays only when loss of lock is indicated by lock detector 200, and act quickly when lock-on is indicated.

In operation, the detection of lock-on by the lock detector 200 is thus effective to quickly switch the input signal into the shaper 174 through the narrow band pilot filter 170. The first delay circuit 202 and the second delay circuit 204 are operative to delay, upon loss of lock-on the operation of the switch 172 to re-insert the wide band pilot filter 168.

This second delay is desirable when the pilot signal being received is changing or drifting in frequency. Such a change will cause lock detector 200 to indicate an out-of-lock condition; because the slow response of narrow filter 184 will not allow the loop to follow a drifting signal. At the end of the delay period introduced by first delay circuit 202, switch 186 will operate to select wide AFC loop filter 182 and thus allowing the loop to make a rapid correction to the new frequency. However, the second delay circuit 204 prevents switch 172 from selecting wideband pilot filter 168 and this protects the loop from interference due to audio signal portions of the received signal. When the correction is complete, the lock-on condition is again sensed by lock detector 200 and switch 186 again selects the narrow AFC filter 184.

The AFC LOCK output signal of the second delay circuit 204 may also be applied to the logic circuit 198 of FIG. 5 as will subsequently explained.

With continued reference to FIG. 4, the output signal from the narrow band pilot filter 170 may be applied through a rectifier 206 and a low pass filter 208 to a comparator 210 to which a variable AGC REF signal is also applied as a standard. The output signal of the comparator 210 serves as the AGC signal and is applied to the RF amplifier 134 and the IF amplifier 148 to control the gain thereof in a conventional manner.

The AGC output signal from the comparator 210 may also be applied to a suitable conventional weak signal detector 212 and the DELAY ADJ output signal therefrom applied to the first delay circuit 202 to thereby vary the delay in the operation of the switch 186 and in the switch 172 in response to the loss of lock-on.

The rectified and filtered output signal from the narrow band pilot filter 170 is also applied to one input terminal of a second comparator 214 to which a manually variable squelch reference signal SQ REF is applied. The output signal from the comparator 214 is applied as the PILOT SQ signal to the logic circuit 198 described in connetion with FIG. 5.

In operation, the adjustment of the reference signal for the comparator 214 may be used to selectively block reception of weak signals. This may be desirable where the operator of a mobile receiver is receiving signals of good signal strength from a desired source as well as occasional signals of weak signal strength from an undesirable source.

As will be explained in greater detail in connection with FIG. 5, the presence of the AFC LOCK, PILOT SQ and TCS LOGIC signals are operative in the logic circuit 198 to generate an SQ GATE signal to unlock the squelch of the receiver by control the gain of the amplifier 164. In other words, the detection of lock-on by the phase detector 176 acts to switch the phase detector 176 loop filter to its narrow bandwidth and to switch the pilot filter to its narrow bandwidth and to generate the AFC LOCK signal applied to logic circuit 198. The presence of a tone signal of sufficient amplitude from the narrow band pilot filter 170 will thus be operative to open the squelch of the amplifier 164 through the generation of the SQ GATE signal.

It is necessary for the generation of the SQ GATE signal (required to open the squelch of amplifier 164)for the TCS LOGIC signal to be applied to the logic circuit 198 when tone coded squelch is incorporated within the system.

The presence of the AFC LOCK signal may be applied through the logic circuit 198 in the form of a CH BUSY signal to a suitable indicator 216.

Figure 5:
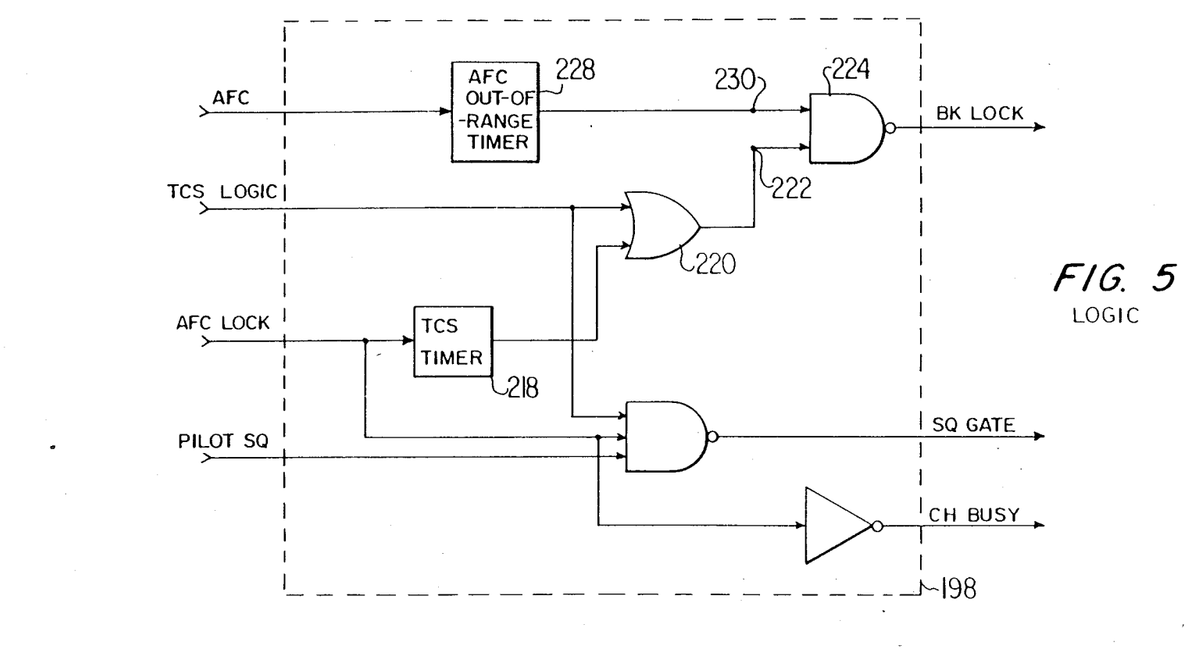
FIG. 5 is a logic diagram of one embodiment of the logic circuit of the receiver illustrated in FIG. 4.

With reference to the logic circuit illustrated in FIG. 5, the AFC LOCK signal is applied to a tone coded squelch (TCS) timer 218 which applies an enabling signal to the OR gate 220 for a predetermined time interval controlled by the RC time constant of the timer 218. At the end of the predetermined time interval, the output signal from the TCS timer 218 is thus removed from the OR gate 220. The other input signal to the OR gate 220 is the TCS LOGIC signal from the tone squelch decoder 196 of the receiver of FIG. 4.

In operation, the presence of PLL lock-on as detected by the lock detector 200 will trigger the TCS timer 218 to apply a signal to one input terminal 222 of a NAND gate 224. The presence of this signal inhibits the generation of the BK LOCK signal for that initial period of time. As a result, the switch 186 in the receiver of FIG. 4 remains in the narrow AFC loop filter position.

The predetermined time interval of the TCS timer 218 is of sufficient duration, e.g. 250 milliseconds, to permit the tone squelch decoder 196 of the receiver of FIG. 4 to determine the presence of the correct frequency modulation of the pilot tone. If the TCS LOGIC signal is present at the time that the signal from the TCS timer 218 is removed, the OR gate 220 will continue to supply a disabling signal to the input terminal 222 of the NAND gate 224 and thus continue to insure the absence of the BK LOCK signal.

The BK LOCK signal may also be enabled if the AFC signal falls below prescribed limits. The AFC signal is applied to an AFC out-of-range timer 228, the output signal from which is applied to the other input terminal 230 of the NAND gate 224.

In operation, the AFC signal dropping below a set level, e.g. 1.5 volts, will trigger the AFC out-of-range timer 228 to apply a BK LOCK disabling signal to the input terminal 230 of the NAND gate 224 for a period of time, e.g. 10 milliseconds. A BK LOCK signal is generated which will actuate switch 185 in FIG. 4 to ground the output of phase detector 176 and thus break AFC LOCK and return the AFC signal to its quiescent high voltage state where it will again attempt to search out and lock to the pilot tone. Thus, the generation of the BK LOCK signal is inhibited for a predetermined period of time following loss of the AFC signal irrespective of the presence of the TCS LOGIC signal.

Figure 6:
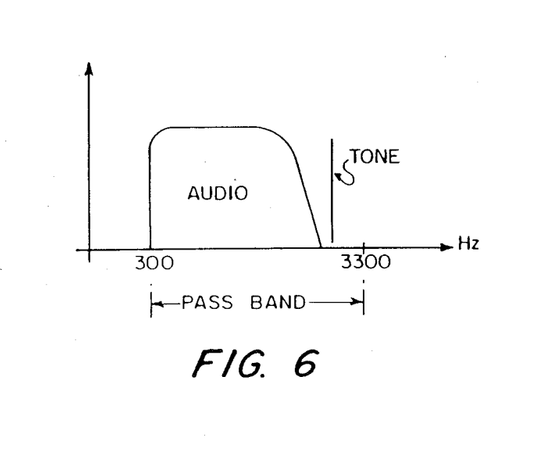
FIG. 6 is a plot of the frequency spectrum illustrating the passband of the transmitter of the present invention.

With reference to FIG. 6, the pass band of the transmitter is desirably between about 300 Hz and 3,300 Hz with the pilot tone at 3100 Hz and the audio band between 300 Hz and about 2,600 Hz with the high pass filter 36 and the low pass filter 44 of FIG. 2 providing the limits. In this way, the pilot tone frequency of 3,100 Hz as determined by the oscillator 70 in FIG. 2 is outside of the audio passband but within the passband of the transmitter.

Figure 7:
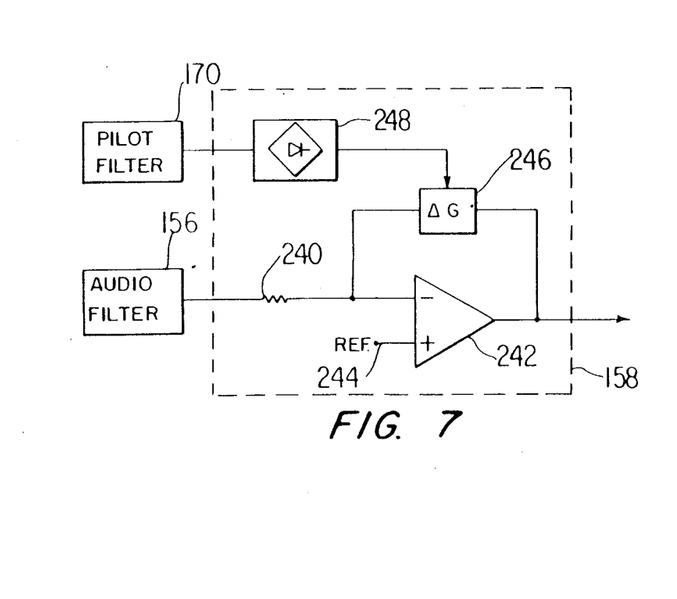
FIG. 7 is a schematic circuit diagram illustrating one embodiment of the first expander in the receiver illustrated in FIG. 4.

With reference to FIG. 7 where the first expander 158 of the receiver illustrated in FIG. 4 is shown, the output signal from the audio filter 156 of FIG. 4 may be applied through a resistor 240 to the negative input terminal of an operational amplifier 242 to which an appropriate reference voltage is applied to the positive input terminal 244 thereof. The output signal from the operational amplifier 242 may be fed back through a variable gain feedback circuit 246 to the negative input terminal 242.

The output signal from the narrow band pilot filter 170 of the receiver of FIG. 4 may be rectified in a rectifier 248 and used to vary the gain of the circuit 246 in the feedback path of the amplifier 242. In this way, the amplitude of the pilot tone may be used to vary the gain of the audio signal without varying the gain of the receiver per se or the composite audio and pilot tone signal as it passes through the receiver.

Figure 8:
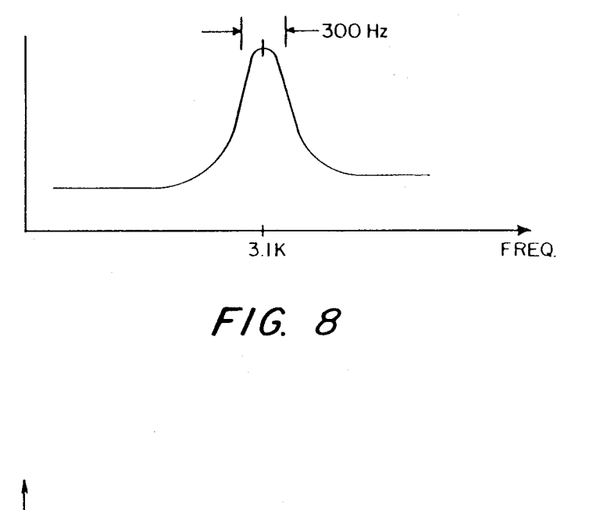
FIG. 8. is a plot of the desired frequency response of the narrow band pilot filter of FIG. 4.

With reference to FIG. 8, the desired frequency response of the narrow band pilot filter 170 is illustrated as having a peak at 3,100 cycles and an effective bandpass of approximately 300 Hz. In this way, the audio bandpass between 300 Hz and 2,600 Hz as illustrated in FIG. 6 may be excluded.

Figure 9:
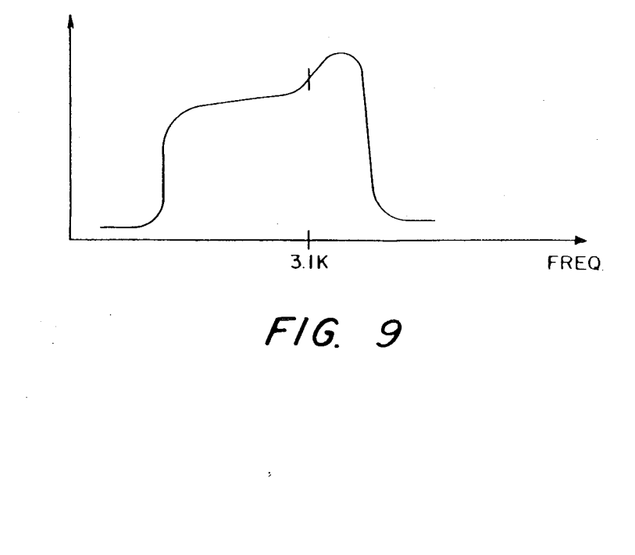
FIG. 9 is a plot of the desired frequency response of the wide band pilot filter of the receiver illustrated in FIG. 4.

With reference to FIG. 9, the desired frequency response of the wide band pilot filter 168 of the receiver of FIG. 4 is illustrated. As earlier explained in connection with FIG. 6, the passband of the transmitter is only slightly wider than the bandwidth of the combined pilot tone and the audio signal passband. By the selection of an appropriate filter such as an under damped, bandpass filter with a peak in response at the high end, the high frequency noise will drive the detector loop 176 to the upper limit of the oscillator associated therewith. This effective shifting of the phase lock loop to the upper frequency limit of the oscillator will insure the presence of the 3,100 Hz pilot tone within the receiver's bandpass and thus enhance the acquisition thereof.

With reference to FIG. 10 and to the tone generator 60 of FIG. 2 by which the tone coded squelch modulation of pilot tone is effected, the TCS TONE output signal from the pilot oscillator 76 may be applied to the loop filter of the phase locked loop 72 as illustrated.

ADVANTAGES AND SCOPE OF THE INVENTION

The transmitter of the present invention operates to broadcast only the pilot tone during an initial time interval. The presence of the pilot tone without the audio signal greatly facilitates the detection thereof and the lock-on of the receiver. In addition the pilot tone is transmitted at full rated power of the transmitter during this initial period and thereafter, when lock-on has been accomplished, the pilot tone amplitude is attenuated to reduce the likelihood of interference with the audio signal. In addition, the automatic level control of the transmitter is effective to adjust the transmitter to its full rated power during the initial time interval when the pilot tone is present at its predetermined maximum amplitude, and thereafter the gain is unchanged. Thus the transmitter gain has been automatically adjusted so the peaks of the audio signal will drive the transmitter to its full rated power but not beyond.

The frequency modulation of the pilot tone by the location of the modulation source in the return end of the loop filter is advantageous where the bandwidth of loop filter is signifcantly lower than the frequency of the modulation.

In the receiver, the selection of a wide band pilot filter or a narrow band pilot filter as a function of lock-on of the phase lock loop is a significant advantage in that the acquisition of the pilot tone is facilitated. The use of a time delay between selection of the wide AFC loop filter and reinsertion of the wideband pilot filter provides additional security against the need for reacquisition in the event the incoming signal shifts slightly in frequency. The probability of drop out in weak signal areas is significantly reduced through the use of the weak signal detector to vary the time delays after loss of lock-on in controlling the automatic frequency control circuits of the receiver Further, the selection of the frequency response characteristics of the wide band pilot filter such that the presence of noise tends to drive the phase lock loop associated therewith to one frequency limit of the oscillator signfcantly enhances acquisition of the pilot tone, as this technique assures the pilot tone lies within the receiver passband.

While preferred embodiments of the present invention have been described, it is to be understood that the embodiments described are illustrative only and that the scope of the invention is to be defined solely by the appended claims when accorded a full range of equivalents, many variations and modifications naturally occurring to those skilled in the art from a perusal hereof.

What is claimed is:

1. A method of acquiring lock-on by a phase lock loop to a pilot tone outside of, but adjacent to one end of, an audio signal passband, wherein the phase lock loop controls the tuning of an associated receiver having a passband only slightly wider than the bandwidth of the combined pilot tone and audio signal passband, to thereby aid in the reception of the audio signal comprising the steps of:
   (a) detecting a signal;
   (b) applying the detected signal to a filter having a frequency response which emphasizes noise at a frequency which will drive the phase lock loop to one frequency limit of the oscillator associated therewith to thereby assure the location of the pilot tone within the receiver passband when the pilot tone is included in the detected signal and thus enhance the acquisition of the pilot tone and thus the reception of the audio signal.

2. The method of claim 1 wherein the filter passes noise at frequencies near the high end of the audio passband; and
   wherein the filter is an under damped, band pass filter with a peak in response at the high end of the filter passband.

3. Means for acquiring phase lock loop lock-on to a pilot tone outside of, but adjacent to one end of, an audio signal passband, wherein a phase lock loop controls the tuning of an associated receiver having a passband only slightly wider than the bandwidth of the combined pilot tone and audio signal passband, to thereby aid in the reception of the audio signal, said means comprising:
   means for detecting a received signal;
   means for applying the detected signal to a filter having a frequency response which emphasizes noise at a frequency which will drive said phase lock loop to one frequency limit of the oscillator associated therewith to thereby assure the location of the pilot tone frequency within the receiver passband when said detected signal includes said pilot tone and thus enhance the acquisition of the pilot tone and the reception of the audio signal.

4. A system for enhancing the reception of an audio signal by a receiver with a fixed width passband comprising:
   means for transmitting a pilot tone and said audio signal within a total passband slightly narrower than the passband of said receiver, the frequency of said pilot tone being outside of the audio signal passband;
   a phase lock loop including a phase detector, a filter and a voltage controlled oscillator;
   means for detecting the transmitted signal;
   means operatively connected to said phase lock loop for filtering said detected signal, said filtering means having a frequency response which passes noise at a frequency which will drive the voltage controlled oscillator of said phase lock loop to one frequency limit thereof, to thereby locate the frequency of said pilot tone within said receiver passband,
   whereby the acquisition of said pilot tone by said phase lock loop is enhanced to thus enhance reception of said audio signal.

5. A receiver comprising:
   means for detecting a signal including an audio signal within an audio passband and a pilot tone having a frequency adjacent to but outside of said audio passband;
   a VCO;
   a phase detector;
   means for applying to said VCO a control signal related in amplitude to the phase of the detected signal, said means having a frequency response which passes noise at a frequency tending to drive said VCO to a frequency limit thereof to thereby locate the frequency of said pilot tone within the passband of the receiver.

6. The receiver of claim 5 wherein said means passes noise at frequencies near the high end of said audio passband, said means including an under damped, band pass filter with a peak in response at the high end thereof.

* * * * *